United States Patent [19]
Shono

[11] Patent Number: 5,126,776
[45] Date of Patent: Jun. 30, 1992

[54] AUTO-FOCUS CAMERA

[75] Inventor: Tetsuji Shono, Tokyo, Japan

[73] Assignee: Asahi Kogaku Kogyo K.K., Tokyo, Japan

[21] Appl. No.: 574,165

[22] Filed: Aug. 29, 1990

[30] Foreign Application Priority Data

Sep. 4, 1989 [JP] Japan .................................. 1-229003

[51] Int. Cl.$^5$ ............................................. G03B 13/36
[52] U.S. Cl. .................................... 354/400; 354/402
[58] Field of Search ............... 354/400, 402, 406, 407, 354/408

[56]       References Cited
        U.S. PATENT DOCUMENTS 4,474,447  10/1984  Kawabata et al. .................. 354/406
4,508,443   4/1985  Matsuzaki et al. .................. 354/402
4,609,274   9/1986  Iwashita et al. ..................... 354/400
4,750,013   6/1988  Yasukawa ........................... 354/400
4,887,117  12/1989  Kobayashi .......................... 354/400

FOREIGN PATENT DOCUMENTS 56-1024  1/1981  Japan .

Primary Examiner—Russell E. Adams
Attorney, Agent, or Firm—Sughrue, Mion, Zinn, Macpeak & Seas

[57]  ABSTRACT

In an auto-focus camera, the focus position of the lens is locked to permit the user to let go of the shutter button, with subsequent depression of the shutter button resulting in photography at the retained focus position of the lens without further lens driving.

18 Claims, 5 Drawing Sheets

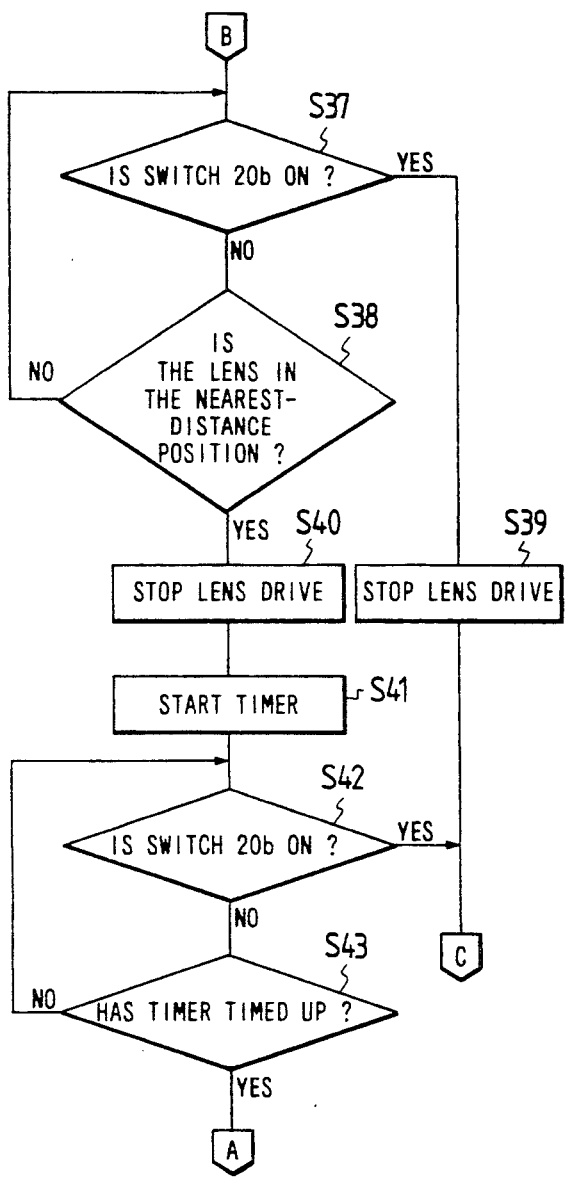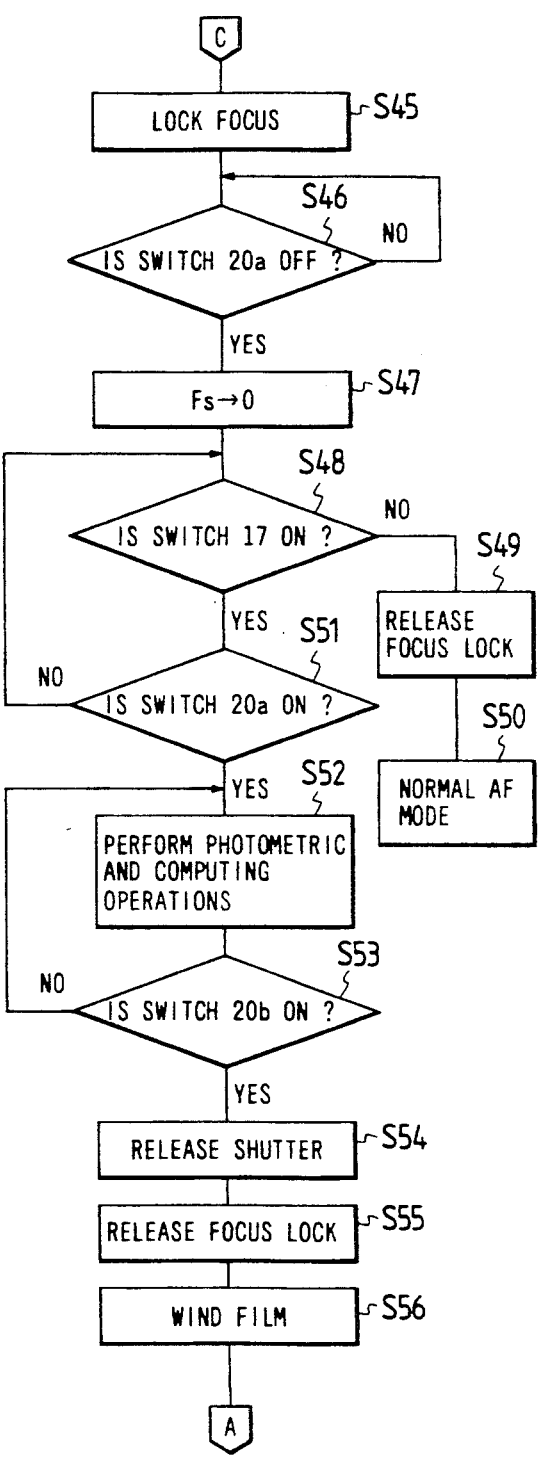
FIG. 4(b)
FIG. 4(c)

AUTO-FOCUS CAMERA

BACKGROUND OF THE INVENTION

The present invention relates to an auto-focus camera, and more particularly to an auto-focus camera having a capability for operation in a pinning mode.

Lens shutter cameras and single-lens reflex cameras having an auto-focus capability are usually adapted to measure the distance from an object to be photographed which is positioned by a photographer at the central portion of a view finder, i.e., at the center portion of an image area. Focusing is achieved in either a single AF mode (hereinafter referred to as an "S" mode) or a continuous AF mode (hereinafter referred as a "C" mode). In an S mode, the area of the object in which the photographer desires to achieve focus is brought into the range finding zone and the release button is partially depressed to bring the object in the center of the image area into focus. When focus is achieved, it becomes possible to release the shutter and the release button is further depressed to activate the shutter.

In a C mode, the release button is partially depressed and the object in the center of the image area is brought into focus. Unlike in the S mode, it is possible to release the shutter even if focus is not achieved. The photographer waits for the right time for releasing the shutter and in accordance with the change in the distance to the object, a focusing operation is performed and the release button is further depressed to activate the shutter.

There are two typical cases where focus is intentionally achieved other than in the focusing zone (range finding zone) of the image area. One is the case where shooting is done with focus achieved for an object located in the marginal portion of the image area, and the other is the case where with a certain location being preliminarily focused, shooting is done after confirming that the object has come to that location. In these cases, the following practice has conventionally been adopted. First, an AF mode selector means is set in the S mode and the object or location at which the photographer desires to achieve focus is brought into the focusing zone and the release button is partially depressed to achieve focusing. Then, with the release button kept partially depressed, the object is located in the desired marginal portion of the image area and the release button is further depressed to release the shutter.

The practice described above, however, has had the following problems. First, if the photographer releases the partially depressed shutter button, subsequent depression of the button will cause another focusing operation where an undesired object in the range finding zone may be brought into focus. To avoid this problem, the release button must be kept partially depressed until just before shooting is done. If the time when the desired object is brought to the intended marginal portion of the image area comes quickly, focusing in the S mode can be accomplished in a satisfactory way. However, if the right time for releasing the shutter does not come quickly, the release button has to be kept partially depressed for a long time, and this is a considerable inconvenience to the photographer. In addition, the associated electric circuit must be kept energized for a long time, leading to increased battery consumption.

SUMMARY OF THE INVENTION

It is therefore an object of the present invention to provide an auto-focus camera that reduces not only the burden on the photographer but also the battery consumption even if there is a long interval of time from focusing to the time of shutter release and which yet is capable of determining any desired lens position.

In one aspect of the present invention, the above-stated object can be attained by an auto-focus camera that has a control means for controlling the drive of an imaging lens, a setting means for setting a pinning mode in which the lens is fixed at a desired position and a switch means for initiating the drive of the lens, with the control means operating in such a way that, when a pinning mode is set by the setting means, the control means drives the lens to a focus position and, once the switch means is turned off, it prohibits further lens drive even if the switch means is turned on again.

According to another aspect of the present invention, there is provided an auto-focus camera that has a control means for controlling the drive of an imaging lens, a setting means for setting a pinning mode in which the lens is fixed at a desired position, a first switch means for initiating the drive of the lens, and a second switch means for terminating the drive of the lens, with the control means operating in such a way that, when a pinning mode is set by the setting means, the control means initiates lens drive by turning on the first switch means and terminates the lens drive by turning on the second switch means, and once the second switch means is turned on, the control means prohibits further lens drive even if the first switch means is turned on again.

According to the first aspect of the present invention, if the switch means is turned on after a pinning mode is set by the setting means, the control means drives the lens until it focuses the image at the location desired by the photographer and it is pinned at that location. Once the switch means is later turned off, further lens drive is prohibited even if the switch means is turned on again. Hence, even if the time interval from focusing to releasing the shutter is lengthy, the photographer does not have to keep pushing down the release button for a prolonged time, whereby not only the burden on the photographer for range finding operations but also the consumption of the battery can be reduced.

According to the second aspect of the present invention, if the first switch means is turned on after a pinning mode is set by the setting means, the lens starts to move from the farthest-distance position to the nearest-distance position, or vice versa, and if the location desired by the photographer is reached, the second switch means is turned on, whereupon the lens drive is terminated at the proper focus position and the lens is pinned at that location. Thereafter, further lens drive is prohibited even if the first switch means is turned on again. Thus, in addition to the advantages attained by the first aspect of the present invention, there is provided a further benefit in that the lens position can be determined at any position that is desired by the photographer.

BRIEF DESCRIPTION OF THE DRAWINGS

The invention will be more clearly understood from the following description in conjunction with the accompanying drawings, wherein:

FIGS. 4a, 4b and 4c are flow charts showing the sequences of AF operations to be performed in a second embodiment of the present invention.

DETAILED DESCRIPTION OF THE PREFERRED EMBODIMENTS

Figure 1:
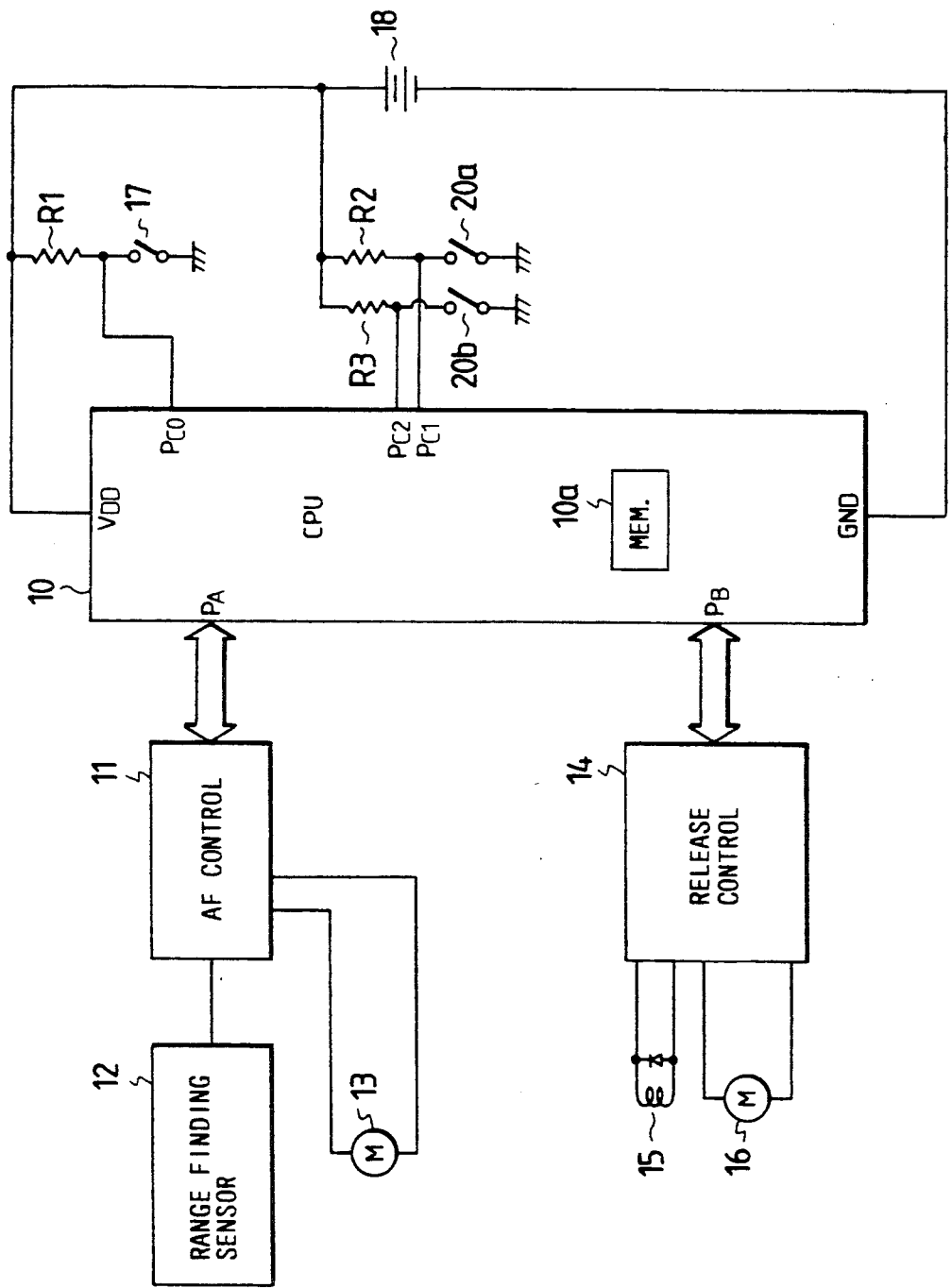
FIG. 1 is a circuit diagram of the control unit used in a first example of the auto-focus camera of the present invention.
Figure 2A:
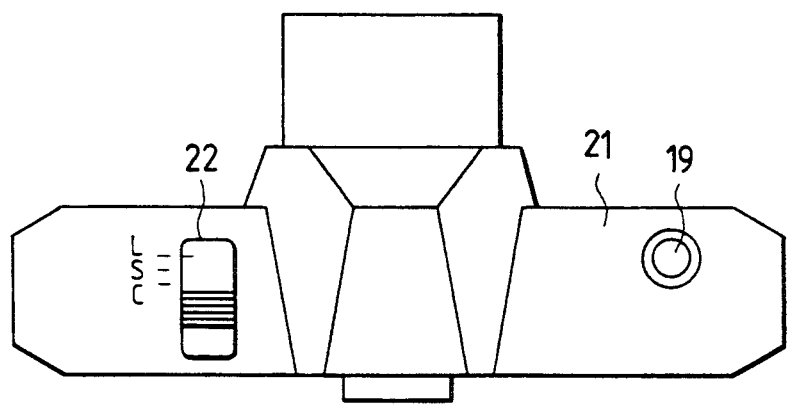
FIGS. 2a and 2b are plan views schematically showing a camera body.
Figure 2B:
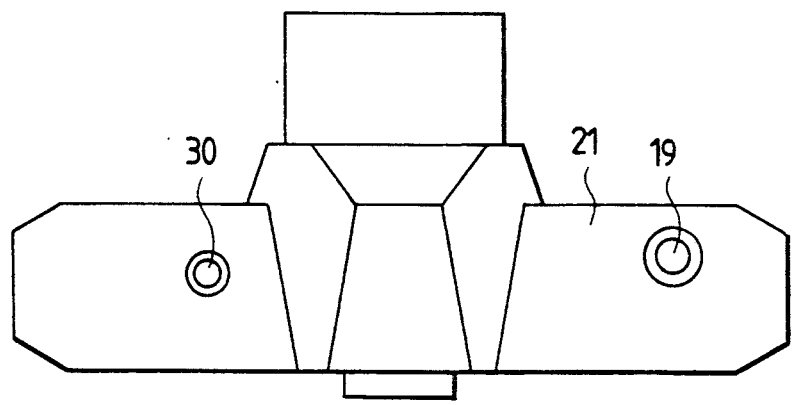
Figure 3:
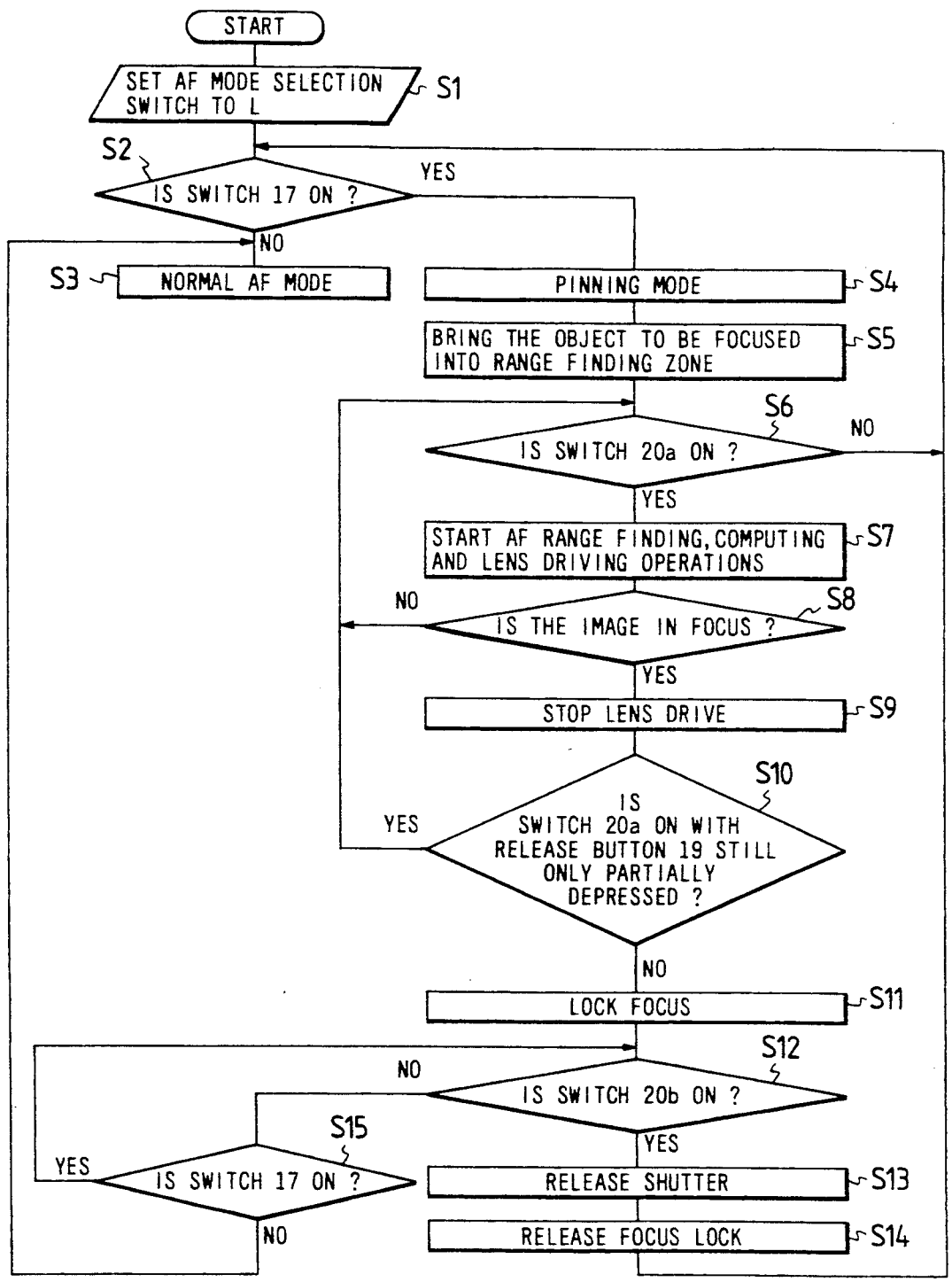
FIG. 3 is a flow chart showing the sequence of autofocus (AF) operations to be performed in a first embodiment of the invention.

FIGS. 1-3 show a first example of the auto-focus camera of the present invention. In FIG. 1, numeral 10 denotes a central processing unit (CPU) for controlling the overall performance of the system. CPU 10 has a memory 10a for storing the programs for AF control, pinning control, release control, photometry and other processing operations, as well as the results of computation and various input data.

An input/output port $P_A$ of CPU 10 is connected to an AF control unit 11 which in turn is connected to a range finding sensor 12 and an AF motor 13. AF motor 13 is connected to a focusing lens (not shown) via speed reducing gears (not shown) and is adapted to move the focusing lens.

AF control unit 11 receives various inputs, including the range finding data detected with the range finding sensor 12 and the rotational data from the AF motor 13, and outputs them to the CPU 10 which, in response to said range finding data, AF mode data and other data, produces a command signal to the AF control unit 11 which in turn controls the drive of the AF motor 13.

Another input/output port $P_B$ of CPU 10 is connected to a release control unit 14 which in turn is connected to a shutter driving actuator 15 and a film winding motor 16. CPU 10 is also connected to a photometric means and a diaphragm drive means (not shown) for performing exposure control, but this aspect is not directly related to the present invention and will not be described in detail.

Shown by 17 is a switch for setting a pinning mode. One contact of this switch 17 is connected to the positive electrode of a battery power source 18 via a voltage setting resistor R1, and the other contact of the switch is grounded. The junction between the switch 17 and the resistor R1 is connected to an input port $P_{C0}$ of CPU 10. The switch 17 corresponds to a means for setting a pinning mode.

The circuit shown in FIG. 1 also includes a switch 20a that turns on when a release button 19 (see FIG. 2) is partially depressed and a switch 20b that turns on when the release button is fully depressed (switch 20a remains on when the release button is fully depressed). These switches 20a and 20b are connected at one contact to the positive electrode of the battery 18 via voltage setting resistors R2 and R3, respectively, and are grounded at their other contacts. In the context of the description in the Summary section above herein, switch 20a corresponds to the switch means in the first aspect of the present invention (or the first switch means in the second aspect of the present invention) and switch 20b corresponds to the second switch means.

The junction between switch 20a and voltage setting resistor R2 is connected to another input port $P_{C1}$ of CPU 10, and the junction between switch 20b and voltage setting resistor R3 is connected to still another input port $P_{C2}$ of CPU 10. The power supply terminal $V_{DD}$ and ground terminal GND of CPU 10 are connected to the positive and negative electrodes, respectively, of the battery 18.

FIG. 2A is a plan view of a camera body 21 which has an AF mode selector switch 22 on the left side of its top portion. This AF mode selector switch 22 is capable of selection between a single AF mode S, a continuous AF mode C and a pinning mode L. When this switch is set to a pinning mode L, the pinning mode switch 17 shown in FIG. 1 is turned on. The release button 19 is provided on the right side of the top portion of the camera body 21.

FIG. 2B is a plan view of a camera body 21 that is provided with a pinning mode setting button 30 which is depressed to activate the pinning mode setting switch 17.

The operation of the system of FIG. 1 having the construction described above is outlined below with reference to the flow chart shown in FIG. 3.

In AF operation, the photographer manipulates the AF mode selector switch 22 on the camera body 21 in such a way that it is set to a pinning mode L (step S1). Alternatively, the pinning mode setting button 30 is depressed to attain a pinning mode. As a result, the pinning mode setting switch 17 shown in FIG. 1 is turned on.

In the next step S2, the input state of input port $P_{C0}$ is fed into CPU 10, which determines whether the pinning mode setting switch 17 has been turned on. If it is found that the switch 17 has not been turned on, the sequence proceeds to step S3 and focusing operation is performed in the normal S or C mode. If it is found that the switch 17 has been turned on, the sequence proceeds to step S4 and the AF mode of the camera is shifted to a pinning mode.

In the next step S5, the object or location to be focused is brought into the range finding zone in a view finder by the photographer. Thereafter, the release button 19 is partially depressed to turn on the switch 20a, whereupon the range finding operation is started. CPU 10 then receives the input state of input port $P_{C1}$ and determines whether the switch 20a has been turned on (step S6). If it is found that the switch 20a has not been turned on, the sequence returns to step S2. If it is found that switch 20a has been turned on, the sequence proceeds to step S7 and a focusing operation is initiated by performing the necessary range finding, computing and lens driving operations. Stated more specifically, CPU 10 supplies an operation command to the AF control unit 11. In response to this operation command, the range finding sensor 12 detects range finding data, which is fed into the CPU 10 through the AF control unit 11. At the same time, CPU 10 computes the distance to the object on the basis of the range finding data and the result of computation is applied to a command signal to the AF motor 13 via the AF control unit 11 so that the AF motor 13 is driven to focus the image.

The amount of rotation of the AF motor 13 is fed back to CPU 10 through the AF control unit 11 and a decision is made as to whether proper focus has been attained (step S8). If the answer is negative, the sequence returns to step S6 and steps S7 and S8 are repeatedly executed until proper focus is attained. If the answer is affirmative in step S8, the sequence goes on to step S9 and the AF motor 13 stops rotating to terminate the lens drive. If, in this case, the release button 19 is kept partially depressed, the range finding mode also continues. Hence, if the distance to the object changes in the continued range finding mode, the operations in steps S7 to S9 are accordingly repeated to cause a change in the focused state.

In order to enable refocusing when the distance to the object has changed in the case described above, another decision is made in step S10 as to whether switch 20a is still on with the release button 19 kept only partially depressed. If the answer is affirmative, the sequence returns to step S7, whereas if the answer is negative, the sequence goes on to step S11 and focus locking is effected. More specifically, the focus state will change in response to the change in the distance to the object that occurs during the continued partial depression of the release button 19, and when the area of the object to be focused is brought to proper focus, the photographer can release the button 19 (it becomes no longer partially depressed) and the range finding operation is stopped momentarily and focus lock is accomplished with the area of the object to be focused being just in focus. The term "focus lock" means that any command for lens drive that comes after the focus lock is nullified to maintain the present lens position. The focus lock thus achieved will not be released even if the release button 19 is partially depressed again.

In the next place, the photographer brings the focused object out of the range finding zone (i.e., to the marginal portion of the image area) and waits for the right time for releasing the shutter, with no force being exerted to push down the release button 19. When the right time for releasing the shutter comes, the photographer fully depresses the release button 19, whereby the switch 20b also turns on. At this time, CPU 10 receives the input state of input port P$_{C2}$ and determines whether the switch 20b has been turned on (step S12). If it is found that switch 20b has been turned on, the sequence goes on to step S13 and the shutter is released. If it is found that switch 20b has not been turned on, the sequence goes on to step S15 and another decision is made as to whether the pinning mode setting switch 17 is on. If the answer is affirmative, the sequence returns to step S12, and if the answer is negative, the sequence returns to step S3. This is in order to insure that if the photographer changes his mind, accidentally locks the focus onto the wrong object or otherwise fails to properly accomplish pinning, the pinning mode can be released and another attempt made, so that correct pinning can be performed without performing an unnecessary shutter releasing operation.

In order to release the shutter, CPU 10 supplies an operation command to the shutter driving actuator 15 through the release control unit 14, in response to which the shutter is released to admit light for exposure, and after exposure the film winding motor 16 is activated to wind the film by one frame.

If the shutter is released and the film winding is completed, the focus lock in the previous cycle of operations is released and the sequence returns to step S2.

As described above, the AF mode selector switch 22 is set to a pinning mode and the release button 19 is partially depressed to focus the image. If the partial depression of the release button 19 is subsequently released, focus lock is accomplished with the area of the object to be focused being in proper focus. This eliminates the need to keep the release button 19 partially depressed until the right time comes for releasing the shutter, whereby the burden on the photographer is reduced and the picture-taking operation is simplified. Furthermore, the release of the range finding mode contributes to a smaller power consumption, whereby rapid exhaustion of the battery is prevented.

Figure 4A:
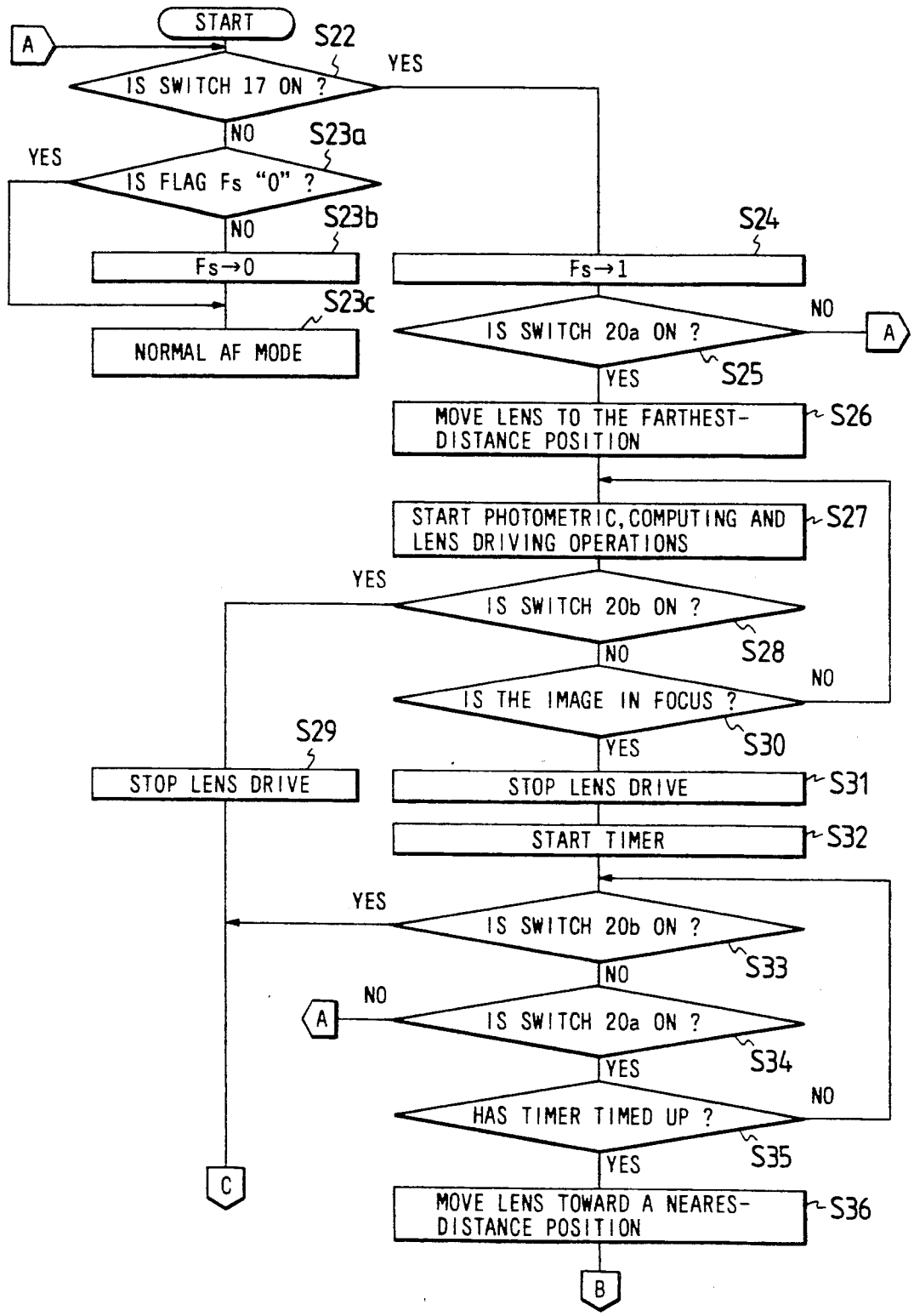

FIGS. 4a, 4b and 4c show a second example of the present invention. This second example is such that in a pinning mode, the lens is first driven to the position where focus is attained for an image at infinity and, then, the lens is driven slowly toward the near-distance position, with the lens drive being terminated at the point of time when the release button is fully depressed or focus is attained, whichever occurs first. As in the first embodiment, the pinning mode setting switch 17 in this second embodiment may be turned on and off by manipulating the pinning mode setting button 30 shown in FIG. 2b.

The operation of the system according to the second embodiment is described below beginning first with reference to FIG. 4a. In step 22, a decision is made as to whether the system is in a pinning mode. If the answer is "NO", the sequence proceeds to step S23a and a decision is made as to whether a shutter drive prohibiting flag Fs is "0" or not. If the answer is "NO", flag Fs is made "0" in step S23b and the sequence proceeds to step S23c, in which the system is made to operate in a normal AF mode.

If the answer to the question in step S22 is "YES", the sequence proceeds to step S24 and the shutter drive prohibiting flag Fs is made "1", whereupon the system is made to operate in a pinning mode. In order to lock the focus in this pinning mode, the release button 19 must be fully depressed but the shutter will not be driven on this occasion on account of the flag Fs.

In the next step S25, a decision is made as to whether the switch 20a (a first switch means) has been turned on and the operation in a pinning mode is initiated. Stated more specifically, if the answer to the question in step S25 is "NO", the sequence returns to step 22 and, if the answer is "YES", the sequence goes to step S26 and the focusing lens is moved to the farthest-distance position at infinity. The arrival of the lens at the farthest-distance position is detected by a well-known switching element which is actuated upon the arrival thereof.

Subsequently, the sequence proceeds to step S27, in which range finding and any necessary computing operations are performed for the object or location to be pinned that lies within the range finding zone. The lens starts to be driven from the infinite distance position on the basis of the results of computation.

In the next step S28, a decision is made as to whether the switch 20b (a second switch means) has been turned on. If it is found that the switch 20b has been turned on before the lens reaches the focusing position, the sequence proceeds to step S29 and the lens drive is terminated, whereupon the sequence shifts to the flow for the operation of shooting in a pinning mode which is outlined in FIG. 4c. If, on the other hand, it is found that the switch 20b has not been turned on, the sequence goes to the next step S30 and a decision is made as to whether the lens has reached the focusing position. If the answer is affirmative, the sequence goes to step S31 and the lens drive is terminated.

The sequence then goes to step S32 and an electronic timer in CPU 10 that is designed to time up beyond a preset time interval (e.g., 4 seconds) is started. If it is found in step S33 that the switch 20b has been turned on as a result of the release button 19 being fully depressed within the preset time interval, the sequence shifts to the flow shown in FIG. 4c.

If the switch 20b is off and if it is found in the next step S34 that the switch 20a is also off (i.e., the photographer has released the shutter button 19), the sequence returns to step S22 and a decision is made as to whether re-pinning should be done or the operation in a pinning mode should be stopped.

If it is found in step S34 that only the switch 20a has been turned on with the release button 19 being partially depressed, the sequence proceeds to step S35, where a decision is made as to whether the timer has timed up. If not, steps S33 to S35 are repeated until the timer times up. If the timer times up, the sequence proceeds to step S36 and the lens starts to be driven from the present focusing position toward a nearer-distance focusing position.

Subsequently, the sequence proceeds to steps S37 and S38 in the flow shown in FIG. 4b and continues checking as to whether the switch 20b has been turned on during the lens drive, this checking continuing until the lens reaches the nearest-distance position. The arrival of the lens at the nearest-distance position is also detected by a well-known switching element which is actuated upon the arrival thereof. If it is found that the switch 20b has been turned on at a time before the lens reaches the nearest-distance position, the sequence proceeds to step S39 and the lens drive is terminated, whereupon the sequence shifts to the flow for the operation of shooting in a pinning mode shown in FIG. 4c.

If the lens reaches the nearest-distance position, the sequence proceeds to step S40 and the lens drive is terminated. The sequence then goes to the next step S41 and the electronic timer in CPU 10 that is designed to time up beyond a preset time interval (e.g., 4 seconds) is started. In steps S42 and S43, a check is made within this preset time interval as to whether the switch 20b has been turned on or not. If it is found that the switch 20b has been turned on, the sequence shifts to the flow shown in FIG. 4c. If, on the other hand, the preset time interval lapses, the sequence returns to step S22 and a check is made as to whether the operation in a pinning mode should be continued.

In the manner described above, pinning can be accomplished with the object or location within the range finding zone being in focus or, alternatively, pinning can be accomplished with the lens being located at a desired position by fully depressing the release button 19 as the lens is moved from the farthest distance position at infinity to the nearest-distance position.

The operation after pinning is accomplished as described below with reference to the flow shown in FIG. 4c. If, in steps S29 and S39 shown in FIGS. 4a and 4b, respectively, the lens drive is terminated at the point of time when pinning is established as a result of the switch 20b having turned on, focus lock is effected in step S45 shown in FIG. 4c.

In the next step S46, a decision is made as to whether the switch 20a has been turned off in order to check whether or not the button 19 has been released. If the photographer who has effected pinning releases the button 19 temporarily in order to make the camera ready for shooting, the switch 20a turns off and the sequence proceeds to step S47, where the shutter drive prohibiting flag Fs is made "0" to thereby enable the shutter to be activated. In other words, when both switches 20a and 20b are once turned-off after the lens drive is terminated, the camera is placed in an ordinary photographing condition.

In the next step S48, a recheck is made as to whether the pinning mode setting switch 17 is on. This is in order to allow the system to operate in a pinning mode again if the first attempt fails. Thus, if the switch 17 is off, the sequence proceeds to step S49 and the focus lock is released, whereupon the operating mode of the system returns to normal AF mode (step S50). If it is found that the switch 17 is on, the sequence proceeds to step S51 and a decision is made as to whether the switch 20a has been turned on as a result of partial depression of the release button 19. If the answer is "NO", the sequence returns to step S48; otherwise the sequence goes to step S52 and the necessary photometric and computing operations are executed. More specifically, exposure data such as a shutter speed, an aperture value and the like are determined based on data obtained by a well-known light measurement device in this step. This measurement is also carried out with a shutter release button still only partially depressed.

In step S53, a decision is made as to whether the switch 20b has turned on as a result of full depression of the release button 19. If the switch 20b is on, the sequence goes to step S54 (the shutter is released) and finally to step S56 (the film is wound by one frame). The sequence then returns to step S22 in FIG. 4a.

As described above, the operation of this second embodiment is such that, in a pinning mode of operation, the shutter button will have to be fully depressed twice to take a picture, i.e., the first time to "pin" or lock the focus and the second time to release the shutter. The shutter drive prohibiting flag Fs serves the purpose of preventing operation of the shutter upon the first depression of the shutter button.

If the operator partially depresses the shutter button, the focusing operation will begin at step S26. If the operator then fully depresses the shutter button before the focussing is finished, the sequence goes to FIG. 4c and step S45 where the focus is locked. The program will then remain in a loop at step S46 until the shutter button is fully released. If the operator then turns off the switch 17, the next partial or full depression of the shutter release button will take the sequence through steps S48, S49 and S50. If the operator does not turn off the switch 17, the second partial depression of the shutter release button will take the sequence through steps S52 and S53 where further photometric operation is performed without driving the lens. Full depression of the shutter release button then takes the sequence through steps S53–S56.

If at the outset the operator partially depresses the shutter release button, this will result in an affirmative decision at step S25, and the focusing operation will continue until the in-focus condition is detected at step S30. If the operator releases his partial depression of the shutter button, switch 20a will open and this will be detected at step S34 and the sequence returns to the beginning without ever locking the focus. Thus, if the user does not press the shutter button fully before releasing it, no focus lock will occur.

In a pinning mode, the lens desirably moves at a slower speed than in the normal focusing operation and this need can be met by the control means.

As described above, the second embodiment of the present invention is capable of establishing pinning at the proper focus position as in the case of the first embodiment, with the second embodiment having the added advantage that the lens can be located at any position that is desired by the photographer.

In each of the two embodiments, only one picture can be taken in a pinning mode. If it is necessary to take more than one picture of the same composition, the first embodiment may be modified in such a way that the established pinning mode will be retained even after the film has been wound by one frame for the next shooting following the release of the shutter, and this modification can be accomplished by processing with software in the CPU. In this case, the pinning mode may be released by repositioning the AF mode selector switch 22 from the pinning mode L.

The above description of the second embodiment assumes the case where the switch 20a is turned on by partially depressing the release button 19. If desired, the switch 20a may be adapted to be turned on by means of a separate photometric button. In the description of the second embodiment, it is also assumed that when the control means is set to a pinning mode, the lens is first moved to the farthest-distance position at infinity and thence moved toward the nearest-distance position to accomplish pinning. It should, however, be noted that the lens may be moved in a reverse way, i.e., from the nearest-distance position toward the farthest-distance position.

As described on the foregoing pages, in accordance with the present invention, focus can be attained at any location desirable to the photographer by turning on one switch means, with the control means for driving the lens being set in a pinning mode. If another switch means is turned on, pinning is accomplished and further lens drive is prohibited by subsequent focus locking. As a result, not only the burden on the photographer for range finding operations but also the consumption of the battery can be reduced even if there is a long time interval from focusing to releasing the shutter. Further, the present invention has the advantage of permitting the lens to be located at any desired position.

What is claimed:

1. In an auto-focus camera capable of automatic focusing operation, said camera comprising control means for controlling the drive of an imaging lens, the improvement wherein said camera has a setting means for selecting a pinning mode of operation in which said lens is fixed at a desired position and switch means for initiating the drive of said lens toward said desired position when said switch means is turned on, and wherein said control means, when a pinning mode is selected by said setting means, drives said lens to said desired position and once said switch means is turned off, said control means prohibits further lens drive even if said switch means is turned on again.

2. An auto-focus camera according to claim 1, wherein said control means is responsive to the turning off of the switch means.

3. An auto-focus camera according to claim 1, wherein said control means and said switch means are actuated by a single control member.

4. In an auto-focus camera capable of focusing operation, said camera comprising control means for controlling the drive of an imaging lens, the improvement wherein said camera has a setting means for selecting a pinning mode of operation in which said lens is fixed at a desired position, first switch means for initiating the drive of said lens when turned on, and second switch means for terminating the drive of said lens when turned on, and wherein said control means, when a pinning mode is selected by said setting means, initiates lens drive by turning on said first switch means and terminates the lens drive by turning on said second switch means, and once said second switch means is turned on, said control means prohibits further lens drive even if said first switch means is turned on again, and wherein said first and second switch means are operated by a single control member.

5. An auto-focus camera according to claim 4, further comprising a shutter drive prohibiting means for prohibiting the release of shutter before the drive of said lens, and wherein said second switch means is turned on by a release button on said camera to release said shutter after said shutter drive prohibiting means allows the release of shutter.

6. An auto-focus camera having a lens, driving means for driving said lens toward a focus position when activated, first switch means switchable by a camera user between at least a first state, for activating said driving means to drive said lens toward said focus position, and a second state, and a shutter release button by which a camera user controls release of a shutter, said camera further including:
    locking means for locking said lens at a desired position after operation of said driving means and retaining said lens at said desired position when said first switch means switches to said second state; and
    means responsive to subsequent depression of said shutter release button for releasing said shutter with said lens at said desired position, wherein said locking means retains said lens at said desired position even upon subsequent switching of said first switch means from said second state to said first state.

7. An auto-focus camera as recited in claim 6, wherein said first switch means is switched from said second state to said first state in response to partial depression of said shutter release button.

8. An auto-focus camera as recited in claim 6, wherein said shutter is released in response to full depression of said shutter release button.

9. An auto-focus camera as recited in claim 6, wherein said desired position is said focus position.

10. An auto-focus camera as recited in claim 6, wherein said camera is operable in a pinning mode wherein said locking means is operable and a non-pinning mode wherein said locking means is not operable, said camera further including selection means operable by said camera user for selecting the mode of operation.

11. An auto-focus camera having a lens, driving means for driving said lens toward a focus position when activated, first switch means switchable by a camera user between at least a first state, for activating said driving means to drive said lens toward said focus position, and a second state, and a shutter release button by which a camera user controls release of a shutter, said camera further including:
    locking means for locking said lens at a desired position after operation of said driving means and retaining said lens at said desired position when said first switch means switches to said second state;
    means responsive to subsequent depression of said shutter release button for releasing said shutter with said lens at said desired position; and
    a second switch means switchable between a first state and a second state, said locking means being responsive to said first state of said second switch means for locking said lens at said desired position, wherein said locking means retains said lens at said desired position even upon subsequent switching of said first switch means from said second state to said first state.

12. An auto-focus camera as recited in claim 11, wherein said locking means retains said lens at said desired position even upon subsequent switching of said first switch means from said second state to said first state.

13. An auto-focus camera as recited in claim 11, wherein said first switch means is switched from said second state to said first state in response to partial depression of said shutter release button.

14. An auto-focus camera as recited in claim 13, wherein said second switch means is switched from said second state to said first state in response to full depression of said shutter release button.

15. An auto-focus camera as recited in claim 14, wherein said shutter is released in response to full depression of said shutter release button when said lens is locked at said desired position.

16. An auto-focus camera as recited in claim 11, wherein said desired position is said focus position.

17. An auto-focus camera as recited in claim 11, wherein said camera is operable in a pinning mode wherein said locking means is operable and a non-pinning mode wherein said locking means is not operable, said camera further including selection means operable by said camera user for selecting the mode of operation.

18. An auto-focus camera according to claim 14, further comprising a shutter drive control means for controlling the release of said shutter to allow said shutter to be released when both said first and second switch means have been returned to said second state from said first state.

* * * * *